Nov. 10, 1936.　　　G. A. MOFFETT　　　2,060,772

REMOTE CONTROL SYSTEM

Filed May 10, 1934

Inventor:
Guy A. Moffett,
by Harry E. Dunham
His Attorney.

Patented Nov. 10, 1936

2,060,772

UNITED STATES PATENT OFFICE 2,060,772

REMOTE CONTROL SYSTEM

Guy A. Moffett, Rexford, N. Y., assignor to General Electric Company, a corporation of New York Application May 10, 1934, Serial No. 724,845

13 Claims. (Cl. 171—223)

My invention relates to remote control systems.

It is an object of my invention to provide a system in which a characteristic of the source of supply may be altered by means of a control circuit completed through a load circuit connected to said source of supply.

It is a further object of my invention to provide a system in which a plurarity of relays, one or more of which are arranged to be energized through a load circuit, are employed for raising or lowering the voltage of a generator to which said load circuit is connected under the control of means arranged to be connected in said load circuit for limiting the flow of current to values below those normally supplied but sufficient to operate one or more of said relays.

Figure 1:
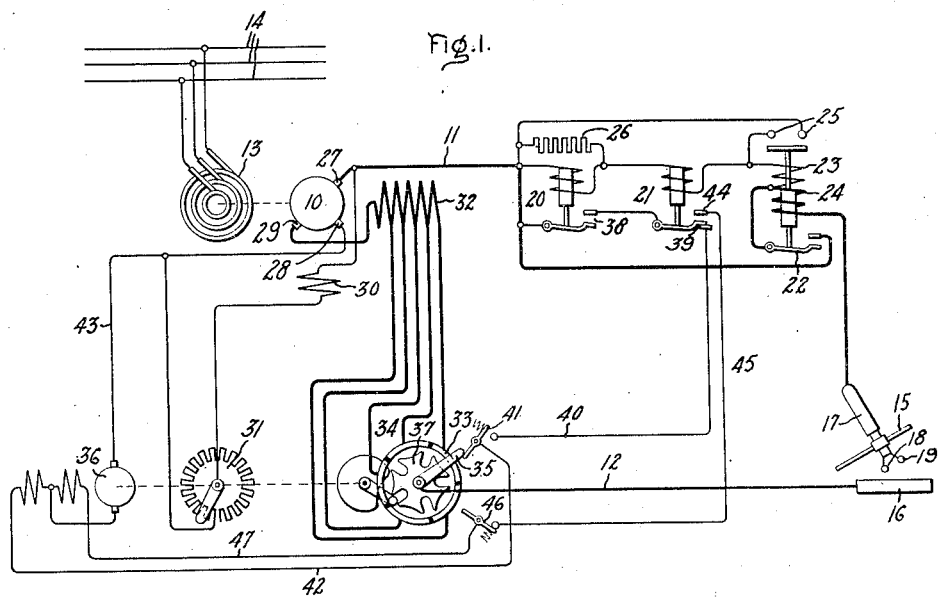
Figure 2:
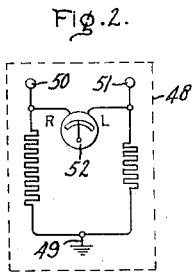

Further objects of my invention will become apparent from the following description taken in connection with the accompanying drawing, Fig. 1 of which diagrammatically represents a system embodying my invention, and Fig. 2 of which shows an indicator and controller for use in a system such as shown in Fig. 1.

The system shown in Fig. 1 of the drawing comprises a generator 10 which is connected to a load device through a load circuit 11, 12. The generator is driven by a motor 13 mechanically connected thereto. This motor is illustrated as an electric motor which is connected to a source of supply 14.

The particular system illustrated is an arc welding system in which the load device comprises the arc established between an electrode 15 and the work 16. The work is connected to generator 10 through load conductor 12 and the electrode is arranged to be held in a welding tool or holder 17 by means of which current is supplied thereto through load conductor 11. The electrode holder is also provided with a plurality of terminals 18 and 19 through which a circuit including conductors 11 and 12 may be completed. The impedance of the terminal connections 18 and 19 are different and greater than the impedance of the connection through the electrode 15 and the clamp in which this electrode is supported.

The completion of a circuit through terminals 18 or 19 is used to control the voltage of generator 10 through the agency of relays 20 and 21. The completion of a circuit through electrode 15 closes switch 22 whose operating coil 23 is connected in shunt thereto and whose holding coil 24 is connected in series therewith. By reason of the connections illustrated in the drawing switch 22 is closed by the combined effect of the flow of current through both coils 23 and 24. Since, however, the principal effect is due to coil 23, this coil is designated as the operating coil. It is, of course, apparent that a circuit through coil 23 can be completed independently of the coil 24 in which case coil 23 would be the sole operating winding. Relays 20 and 21 are connected in series with one another and with the operating coil 23 of the switch 22. These relays are arranged to operate on different current values both of which are less than the current value at which switch 22 operates.

The closure of switch 22 completes through contacts 25 a short circuit about the operating windings of relays 20 and 21 thus preventing any transformer action between its coils 23 and 24 circulating current through these windings. If necessary resistance 26 may be connected across the operating coil of the relay 20 to delay its operation so that it will close subsequently to the closure of the switch 22.

The generator 10 is of the type described and claimed in U. S. Letters Patent No. 1,340,004, Sven R. Bergman, granted May 11, 1920. In this type of generator the electromotive force between a main brush 27 and an auxiliary brush 28 is substantially constant, while the electromotive force between the auxiliary brush 28 and a main brush 29 changes in value and direction in accordance with the condition of the arc. The generator is illustrated as having a field 30 connected through a rheostat 31 to the substantially constant potential between brushes 27 and 28 and a series field 32 provided with taps which are connected to segments 33 of a switch 34 the position of the arm 35 of which determines the number of series field turns connected in the load circuit 11, 12. The rheostat 31 and tap switch 34 are mechanically connected to and driven by a pilot motor 36 which is rotated in one direction or another depending upon the closure of one or both of relays 20 and 21. The tap switch 34 is operated through a Geneva movement 37 to change the number of turns of the field 32 connected in the load circuit at the time the rheostat 31 changes from a maximum to a minimum or a minimum to a maximum position due to the rotation imparted thereto by the pilot motor 36. By thus controlling the fields of the generator 10 a wide range of adjustment is provided.

The construction of the system will be further described in connection with its operation.

In the drawing the various parts have been illustrated in the positions they assume when deenergized.

If the welding operator desires to raise or lower the voltage of the generator 10 he can accomplish this result by completing a circuit through either terminal 18 or terminal 19. The circuit through terminal 18 is of greater impedance than the circuit through terminal 19, and both of these circuits are of greater impedance than the circuit through electrode 15 and the clamp in which this electrode is supported in holder 17. By touching terminal 18 to the work 16 a circuit is completed through the load circuit 11, 12, the operating windings of relays 20 and 21 and the windings 23 and 24 of switch 22. Due to the impedance of this circuit the current flow is limited to a value sufficient only to operate relay 20. The closure of relay 20 completes through its contacts 38 a control circuit for the motor 36 by means of which this motor is operated in a direction to increase the voltage of the generator 10. This circuit is as follows:—From main brush 27 of the generator 10 through conductor 11, contacts 38 of relay 20, contact 39 of relay 21, conductor 40, limit switch 41, conductor 42, motor 36, and conductor 43 to the auxiliary brush 28 of the motor 10. In the arrangement illustrated the limit switch 41 is in an open position due to the fact that all of the series field 32 has been connected in the load circuit, and the operation of the relay 20 will consequently produce no further increase in the voltage of the generator. If, however, the operator completes a circuit through the terminal 19 a circuit of lower impedance will be established and a greater flow of current will occur which will energize both of relays 20 and 21. The operation of both of these relays will complete a control circuit for the motor 36 by means of which the voltage of the generator 10 will be decreased. This circuit is as follows:—From main brush 27 of generator 10 through conductor 11, contacts 38 of relay 20, contacts 44 or relay 21, conductor 45, limit switch 46, conductor 47, motor 36 and conductor 43 to the auxiliary brush 28 of generator 10.

When a circuit is completed through terminals 18 and 19 its impedance is so great that enough current will not flow to energize the coils 23 and 24 of the switch 22 sufficiently to close it. If, however, the welding circuit is completed by touching the electrode 15 to the work 16, a circuit of much lower impedance is completed and the switch 22 will be sufficiently energized to close the closure of switch 22 completes its holding circuit through its coil 24 connected in series therewith. The closure of switch 22 also completes through contacts 25 a short circuit about the operating coils of the relays 20 and 21. During welding the fluctuating current through coil 24 of switch 22 may introduce in the winding 23 of the switch 22 through transformer action a current sufficient to operate the relays 20 and 21 and by short circuiting these coils through contacts 25 such operation is prevented.

In order to prevent momentary energization of the motor 36 when the welding operator strikes his welding arc, it is essential that the switch 22 close slightly before relay 20 closes. The closing action of the switch 22 due to its inertia of moving parts may be slower than the closing action of the relay 20 and if this is so, a resistance 36 should be connected across the operating coil of the relay 20 to retard its closing so that the switch 22 can close first.

Upon the closure of switch 22 both the operating coils of relays 20 and 21 are deenergized by the consequent completion of the welding circuit about them and a short circuit about their operating coils is completed through contacts 25 of this switch. A closed circuit through the operating coil 23 of switch 22 is also completed through contacts 25. This closed circuit causes switch 22 to have a delayed opening characteristic which will prevent repeated operation of this switch when the operator repeatedly strikes an arc during welding.

The terminals 18 and 19 may be eliminated from the electrode holder 17 by providing a controller box 48 diagrammatically illustrated in Fig. 2. This controller box is provided with two circuits of different impedance, each of which is sufficiently great to prevent the operation of the switch 22 when connected in circuit therewith. The circuit of greater impedance is connected between an electrode terminal 50 and a ground connection 49, and the circuit of lesser impedance is connected between the electrode terminal 51 and the ground connection 49. The arrangement is such that when the electrode 15 is touched to the terminal 50 when the ground connection 49 is in engagement with the work 16, an operating circuit is completed for relay 20, and when the electrode is touched to the terminal 51 under the same conditions an operating circuit is completed for relays 20 and 21. Thus, by touching the electrode 15 to the terminal 50 the voltage of the generator 10 can be raised, and by touching the electrode 15 to the terminal 51 the voltage of the generator 10 can be lowered. An electrical instrument illustrated as connected between the terminals 50 and 51 of the control box 48 may be used to indicate the change in either or both generator voltage and current accomplished by completing the welding circuit through the control box for a predetermined length of time.

The possibility of burning the terminals 18 and 19 of the electrode holder 17, or the terminals 50 and 51 of control box 48 is negligible as the energy to be dissipated in either of the circuits completed through these terminals will not in most cases exceed 100 watts.

It is apparent that the systems illustrated may be variously modified without departing from the spirit and scope of my invention. For example, voltage responsive relays may be used in place of the current responsive relays 20 and 21. Furthermore, other arrangements may be employed for completing circuits of different and greater impedance than the normal impedance of the welding circuit. It is also apparent that the control system described may be used for altering any characteristic of a source of supply and is not limited to a voltage control system such as illustrated. It is also apparent that any type of welding generator may be employed, and any suitable arrangement may be used for controlling the field energization of its generator in response to the operation of the relays corresponding to the relays 20 and 21 of the particular embodiment illustrated and described above. These and other modifications may be made without departing from my invention, and I aim in the appended claims to cover all such modifications as fall within the true spirit and scope of my invention.

What I claim as new and desire to secure by Letters Patent of the United States, is:—

1. A power system comprising a source of supply, a load circuit connected to said source of supply, a plurality of relays one or more of which are arranged to be energized through said load circuit in accordance with its impedance, means for altering or reversely altering a characteristic of said source of supply depending on the operation of one or more of said relays, and means arranged to be connected in said load circuit to control its impedance and the operation of said relays.

2. A power system comprising a source of supply, a load circuit connected to said source of supply, means arranged to be energized through said load circuit in accordance with its impedance for altering a characteristic of said source of supply, and means arranged to be connected in said load circuit for controlling its impedance and for indicating the alteration in said characteristic of said source.

3. A power system comprising a source of supply, a load circuit connected to said source of supply, means arranged to be energized through said load circuit in accordance with its impedance for altering a characteristic of said source of supply, means arranged to be connected in said load circuit for controlling its impedance, and means associated with said last mentioned means for indicating an alteration in said characteristic.

4. A power system comprising a source of supply, a load circuit connected to said source of supply, a plurality of relays one or more of which are arranged to be energized through said load circuit in accordance with its impedance, means for altering or reversely altering a characteristic of said source of supply depending on the operation of one or more of said relays, means arranged to be connected in said load circuit to control its impedance and the operation of said relays, and means associated with said last mentioned means for indicating the condition of said generator with regard to said characteristic.

5. A power system comprising a generator, a load circuit connected to said generator, a switch in said load circuit arranged to be closed when said load circuit is completed under normal operating conditions, a control circuit in shunt to said switch, a plurality of relays in said control circuit one or more of which are arranged to operate in accordance with the impedance of said load circuit, means including said relays for raising or lowering the voltage of said generator depending on the operation of one or more of said relays, and means for increasing the impedance of said load circuit above normal to values determining the operation of one or more of said relays.

6. A power system comprising a generator, a load circuit connected to said generator, a switch in said load circuit arranged to be closed when said load circuit is completed under normal operating conditions, a control circuit in shunt to said switch, a plurality of relays in said control circuit one or more of which are arranged to operate in accordance with the impedance of said load circuit, means including said relays for raising or lowering the voltage of said generator depending on the operation of one or more of said relays, and means arranged to be connected in said load circuit to control its impedance and the operation of said relays.

7. A power system comprising a generator, a load circuit connected to said generator, a switch in said load circuit having an operating coil connected in shunt thereto and a holding coil connected in series therewith, two relays having operating coils connected in series with one another and with the operating coil of said switch and arranged to operate at different current values both of which are less than the current value at which said switch operates, means for raising or lowering the voltage of said generator depending on the closure of one or both of said relays, and means for limiting the flow of current in said load circuit to values operating one or both of said relays but insufficient to operate said switch.

8. A power system comprising a generator, a load circuit connected to said generator, a switch in said load circuit having an operating coil connected in shunt thereto and a holding coil connected in series therewith, two relays having operating coils connected in series with one another and with the operating coil of said switch and arranged to operate at different current values both of which are less than the current value at which said switch operates, means for raising or lowering the voltage of said generator depending on the closure of one or both of said relays, means for limiting the flow of current in said load circuit to values operating one or both of said relays but insufficient to operate said switch, and a closed circuit about the operating coil of said switch arranged to be completed upon the closure of said switch.

9. A power system comprising a generator, a load circuit connected to said generator, a switch in said load circuit having an operating coil connected in shunt thereto and a holding coil connected in series therewith, two relays having operating coils connected in series with one another and with the operating coil of said switch and in shunt to said switch, said relays being arranged to operate at different current values both of which are less than the current value at which said switch operates, means for raising or lowering the voltage of said generator depending on the closure of one or both of said relays, means for limiting the flow of current in said load circuit to values operating one or both of said relays but insufficient to operate said switch, and a short circuit about the operating coils of said relays arranged to be completed upon the closure of said switch.

10. A power system comprising a generator, a load circuit connected to said generator, a switch in said load circuit having an operating coil connected in shunt thereto, a relay having an operating coil connected in series with the operating coil of said switch and in shunt to said switch, said relay being arranged to operate at a lesser current value than the current value at which said switch operates, means for altering a characteristic of said generator depending on the closure of said relay, means for limiting the flow of current in said load circuit to a value sufficient to operate said relay but insufficient to operate said switch, and a short circuit about the operating coil of said relay arranged to be completed upon the closure of said switch, said switch being adapted to close more rapidly than said relay when both said switch and said relay are simultaneously sufficiently energized to operate them to their closed positions.

11. A power system comprising a source of supply, a load circuit connected to said source of supply, means arranged to be energized through said load circuit in accordance with its impedance for altering a characteristic of said source of supply, and means arranged to be connected in said load circuit for controlling its impedance and the operation of said last mentioned means.

12. A power system comprising a generator, a load circuit connected to said generator, a switch in said load circuit arranged to be closed when said load circuit is completed under normal operating conditions, a relay having its operating coil connected in shunt to said switch, means for altering a characteristic of said generator depending on the closure of said relay, means for limiting the flow of current in said load circuit to a value sufficient to operate said relay but insufficient to operate said switch, and a short circuit about the operating coil of said relay arranged to be completed upon the closure of said switch, said switch being adapted to close more rapidly than said relay when both said switch and said relay are simultaneously sufficiently energized to operate them to their closed positions.

13. A power system comprising a generator, a load circuit connected to said generator, a switch in said load circuit having an operating coil connected in shunt thereto and a holding coil connected in series therewith, a relay having an operating coil connected in shunt to said switch and in series with the operating coil of said switch upon the closure of said switch, means for altering a characteristic of said generator depending on the closure of said relay, means for limiting the flow of current in said load circuit to a value sufficient to operate said relay but insufficient to operate said switch, and a short circuit about the operating coil of said relay arranged to be completed upon the closure of said switch.

GUY A. MOFFETT.

CERTIFICATE OF CORRECTION.

Patent No. 2,060,772.   November 10, 1936.

GUY A. MOFFETT.

It is hereby certified that error appears in the printed specification of the above numbered patent requiring correction as follows: Page 2, first column, line 43, for the words "contacts 44 or" read contact 44 of; line 53, for "close the" read close. The; and that the said Letters Patent should be read with these corrections therein that the same may conform to the record of the case in the Patent Office.

Signed and sealed this 26th day of January, A. D. 1937.

Henry Van Arsdale (Seal)   Acting Commissioner of Patents.